(12) United States Patent
Kodimer

(10) Patent No.: US 9,497,337 B2
(45) Date of Patent: Nov. 15, 2016

(54) AUTOMATIC SELECTION OF MOBILE DEVICE DEFAULT ACTION

(71) Applicants: Toshiba Tec Kabushiki Kaisha, Tokyo (JP); Kabushiki Kaisha Toshiba, Tokyo (JP)

(72) Inventor: Marianne Kodimer, Huntington Beach, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 32 days.

(21) Appl. No.: 14/291,821

(22) Filed: May 30, 2014

(65) Prior Publication Data
US 2015/0350467 A1   Dec. 3, 2015

(51) Int. Cl.
| G06F 3/12 | (2006.01) |
| G06K 15/00 | (2006.01) |
| H04N 1/00 | (2006.01) |
| H04N 1/21 | (2006.01) |

(52) U.S. Cl.
CPC ............ *H04N 1/00307* (2013.01); *H04N 1/21* (2013.01)

(58) Field of Classification Search
USPC ........................................................ 358/1.15
See application file for complete search history.

(56) References Cited

U.S. PATENT DOCUMENTS

| 2009/0021770 A1* | 1/2009 | Salgado ................ G06F 17/241 358/1.15 |
| 2011/0026069 A1* | 2/2011 | Jesudason et al. ........... 358/1.15 |
| 2011/0317211 A1* | 12/2011 | Yamada et al. .............. 358/1.15 |
| 2012/0081745 A1* | 4/2012 | Asai .............................. 358/1.15 |
| 2013/0342866 A1* | 12/2013 | Hansen et al. ............... 358/1.14 |
| 2014/0002857 A1* | 1/2014 | Huang et al. ................. 358/1.15 |

* cited by examiner

*Primary Examiner* — Huo Long Chen
(74) *Attorney, Agent, or Firm* — SoCal IP Law Group LLP; Steven C. Sereboff; Jonathan Pearce (57) ABSTRACT

Systems and methods for automatic selection of mobile device default action are disclosed. The method comprises presenting a default action and a list of alternative actions that identify document processing operations that may be completed by a multifunction peripheral to thereby generate an electronic document, the default action automatically selected and the list of alternative actions available for selection and receiving user interaction, on the mobile device, with the list of alternative actions thereby selecting a selected alternative action. The method further includes storing the selected alternative action as a new default action, sending instructions to the multifunction peripheral to begin a document processing operation identified by the selected alternative action, and presenting, on the mobile device, the new default action and a second list of alternative actions available for selection, the second list of alternative actions including the default action and excluding the new default action.

20 Claims, 9 Drawing Sheets

AUTOMATIC SELECTION OF MOBILE DEVICE DEFAULT ACTION

BACKGROUND

Field

This disclosure relates to user interfaces for mobile devices used in conjunction with multifunction peripherals.

Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents, which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document, which the MFP has also scanned, or from an input electronic document, which the MFP has converted to a fax format.

MFPs are often incorporated into corporate or other organization's networks, which also include various other workstations, servers and peripherals. An MFP may also provide remote document processing services to external or network devices.

Increasingly, users have access to mobile devices, such as mobile telephones, tablets, and mobile computers, and wish to interact with MFPs that are available to them to accomplish tasks. The capabilities and processing power of mobile devices sometimes exceed those available on the MFP itself. As such, user interface tasks and tasks which utilize network access, either for the MFP or in order to perform a function involving transmission or storage of the resulting document may rely upon the mobile device used, rather than direct interaction or operation by the MFP.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Performing document processing operations directly from a mobile device enables users to avoid the hassle of moving documents from the mobile device to a computer suitably adapted to provide document processing requests to an MFP. In many situations, a user may receive a document at his or her mobile device via email. The user may then wish to print or to fax or store that document in a network or cloud location. In other situations, the user interface and processing powers available to a mobile device may provide a better user experience than is available on an MFP. In addition, a user's mobile device may be with them while taking part in meetings, while in his or her office, while at home and while far from any MFP.

Because mobile devices are typically small, and touch-based, the user interface experiences must be well-designed to avoid screen clutter and to provide good experiences for users. Extraneous settings and options are typically hidden. However, because most mobile devices are capable computing devices, user interfaces can be designed in such a way to make the most important options or the most important options given a particular situation or workflow, most obvious.

Description of Apparatus

Figure 1:
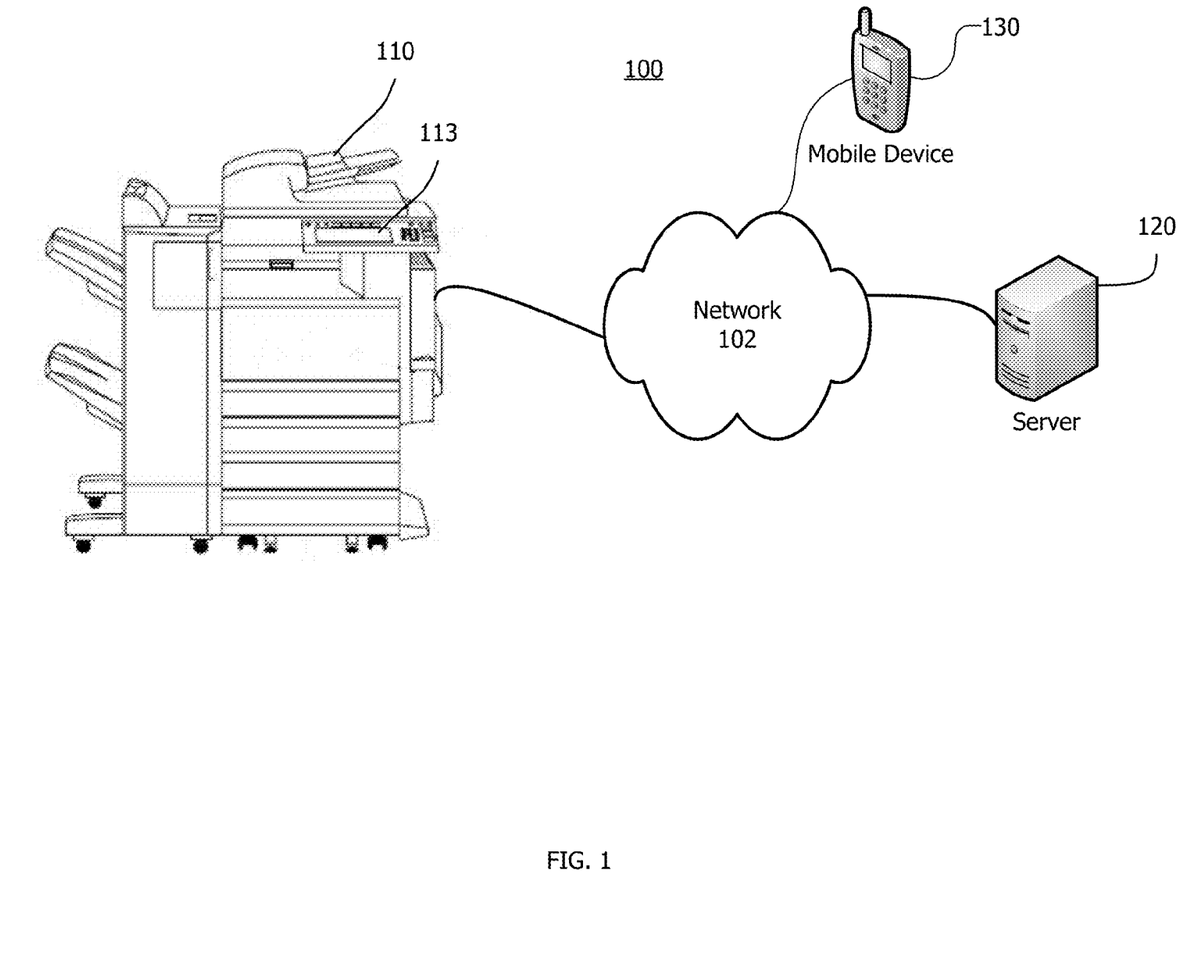
FIG. 1 is a diagram of an MFP system.

Referring now to FIG. 1 there is shown an MFP system 100. The system 100 includes an MFP 110, a server 120, and a mobile device 130, all interconnected by a network 102. The system 100 may be implemented in a distributed computing environment and interconnected by the network 102. An MFP system may include more than one MFP, more than one server, and many more than one mobile devices.

The network 102 may be a local area network, a wide area network, a personal area network, a mobile or telephone network, the Internet, an intranet, or any combination of these. The network 102 may have physical layers and transport layers according to IEEE 802.11, Ethernet or other wireless or wire-based communication standards and protocols such as WiMAX®, Bluetooth®, mobile telephone and data protocols, the public switched telephone network, a proprietary communications network, infrared, and optical.

The MFP 110 may be equipped to receive portable storage media such as USB drives. The MFP 110 includes a user interface subsystem 113 which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alpha-numeric keypad and/or an associated thin client through which a user may interact directly with the MFP 110.

The server 120 is software operating on a server computer connected to the network.

The mobile device 130 is a mobile or handheld PC, a tablet or smart phone, a feature phone, smart watch, or other similar device. The mobile device 130 is representative of one or more end-user devices and may be considered separate from the system 100.

Figure 2:
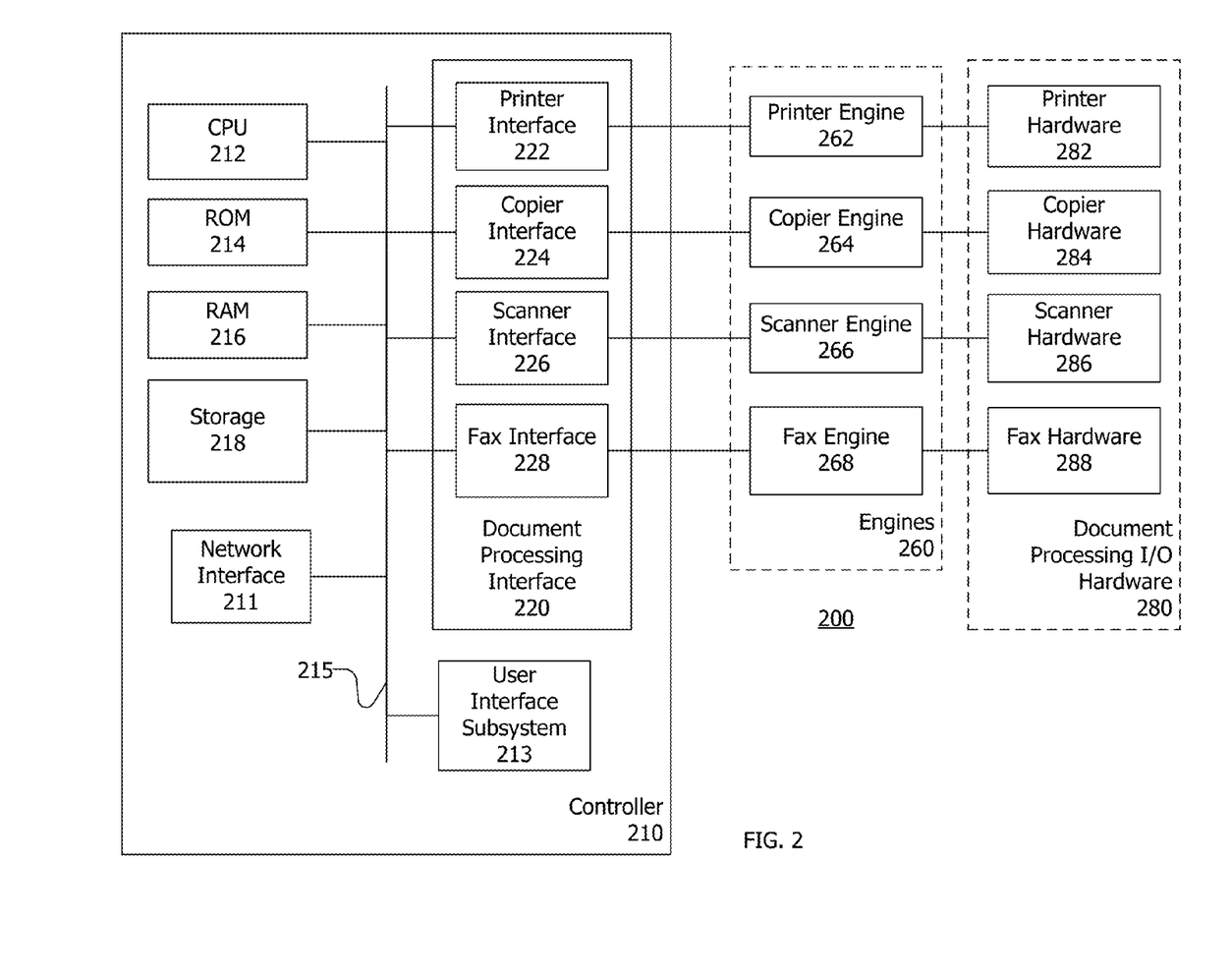
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
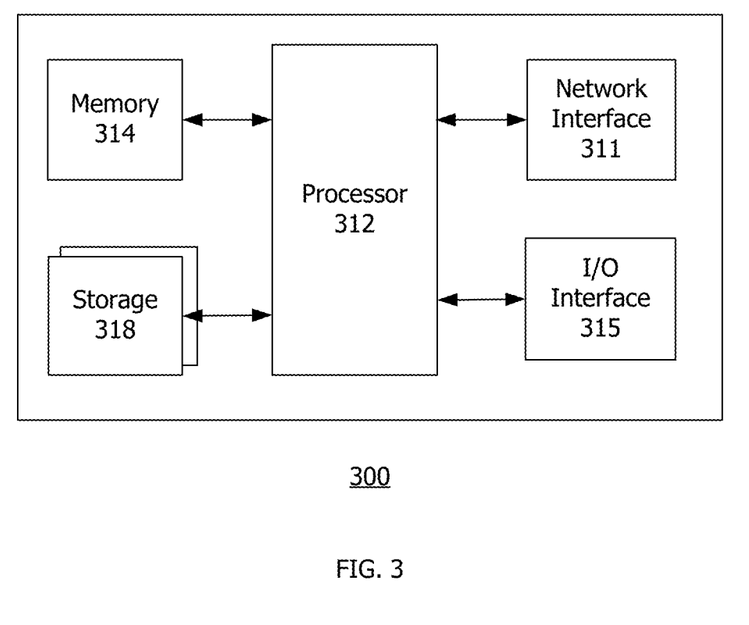
FIG. 3 is a block diagram of a computing device.

Turning now to FIG. 3, there is shown a computing device 300, which is representative of the server computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

Figure 4:
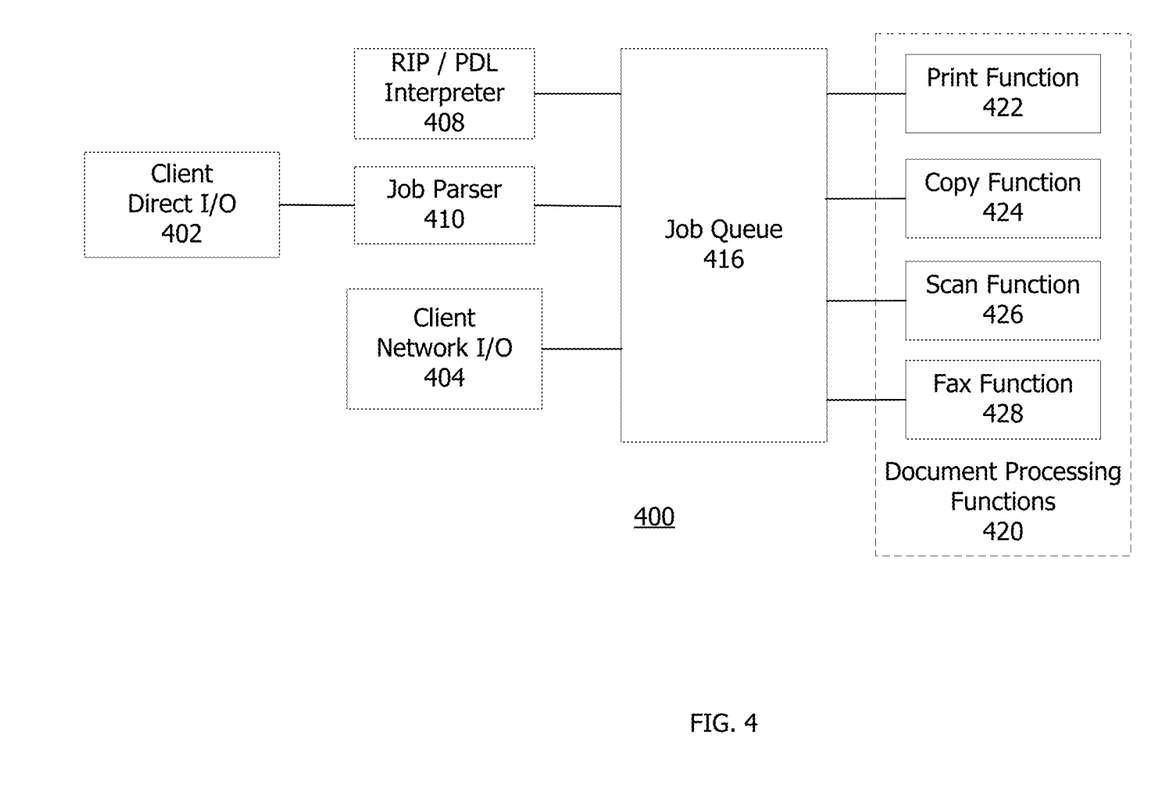
FIG. 4 is a block diagram of a software system for an MFP.

Turning now to FIG. 4 there is shown a block diagram of a software system 400 of an MFP which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Figure 5:
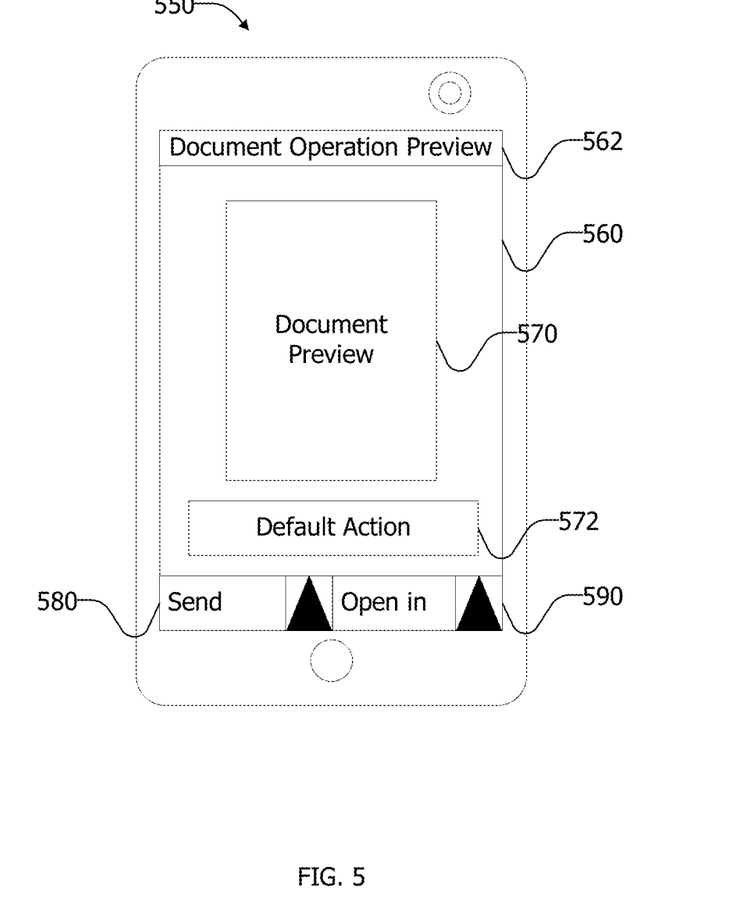
FIG. 5 is a mobile device user interface showing a default action.

Turning now to FIG. 5, a mobile device 550 user interface 560 showing a default action is shown. The mobile device 550 is a computing device, such as that shown in FIG. 2. The user interface 560 is a visual system of interacting with the mobile device 550 presented on a display that may include a touch screen overlay for detecting user touch or similar input. The user interface 560 enables user interaction with the mobile device 550 in order to accomplish tasks using the mobile device 550.

The mobile device 550 user interface 560 includes a document preview 570. The document preview 570 may show the document operation to take place as a document operation preview 562 and may include one or more pages of a document that may result from the document processing operation identified by the default action button 572.

The document operation preview 562 may be a description of the document operation to which the document preview 570 relates. For example, the document operation preview may indicate that it is a scan operation, a print operation, an email operation, a cloud storage operation or the like. The document operation preview 562 may merely say, "scan preview" or something similar.

The default action button 572 is presented in the form of a button, but may take any form, including merely an indication to proceed. The default action button 572 identifies some or all of a default action (a document processing operation) that may take place and that is automatically selected by the mobile device as a default option. The default action may be, for example, send the scan to a cloud location, store in a network drive location, send a document via email, and other operations. The default action, represented by the default action button 572 may also include the base operation itself, such as scanning, printing, emailing, faxing or otherwise operating upon a document or electronic document. Furthermore, the default action may identify a location to which to send to, store to, print to (one of a number of available MFPs or even another MFP or printer available via a network), a default email address to which to send an email to and other similar options.

The user interface 560 also includes two sets of alternative action menus 580 and 590. The alternative action menus 580 and 590 may take the form of a drop down menu, or a listing of alternative actions. In the example shown on user interface 560, the alternative action menus 580 and 590 are shown as drop down menus. The alternative action menus 580 and 590 identify alternative actions (and associated settings) that may be selected by a user in place of the default action button 572.

These alternative action menus 580 are discussed with reference to FIGS. 6 and 7 below.

Figure 6:
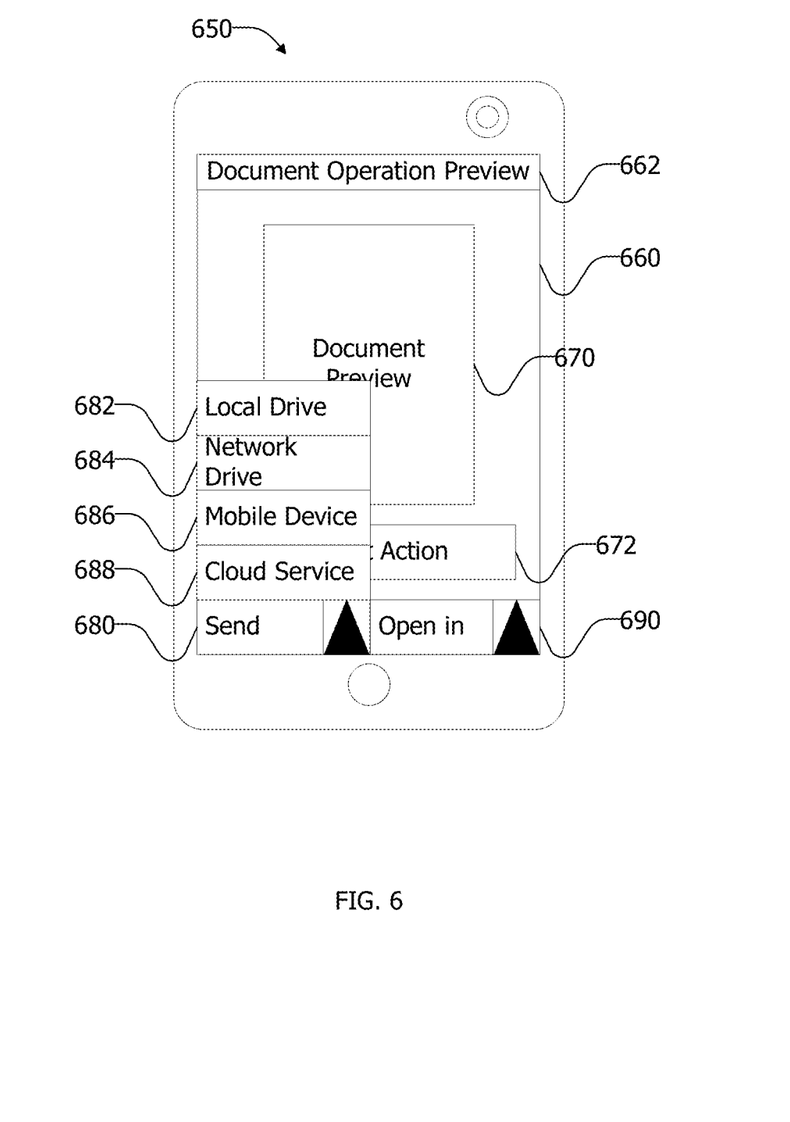
FIG. 6 is a mobile device user interface showing one set of alternative actions.

Turning now to FIG. 6, a mobile device user interface showing one set of alternative actions is shown. The mobile device 650, user interface 660, document preview 670, default action button 672, alternative action menus 680 and 690 are substantially the same as those shown in FIG. 5. They will not be discussed again here.

However, as seen in FIG. 6, the alternative action menu 680 has now been selected, which has resulted in expansion of the related "drop down" menu (which actually extends upward on the display in this example) including a list of alternative actions. This alternative action menu 680 includes operations of "send to" type that enable the resulting document to be "sent to" one or more locations.

As a result, the buttons displayed include those locations. Selection of the local drive button 682 directs the mobile device to send the results of the document processing operation identified by the document operation preview 662 and shown in the document preview 670 to a local drive. This may mean storage on a hard disk drive available locally to the MFP or to a user's self-identified computer. Selection of the network drive button 684 instructs the operation to store the document on a network drive available to the MFP. Associated user authentication protocols and credentials may be required or may be associated with and stored in a mobile device 650 or in association with user credentials required to access the MFP using the mobile device 650.

Selection of the mobile device button 686 instructs the MFP to store the resulting document on the mobile device

650. Mobile devices typically have flash storage available for use in storing data. The user may be further directed to identify a location on the mobile device 650 for storing the resulting document or a default location may be automatically selected.

Selection of the cloud service button 688 instructs the MFP to store the resulting document on a cloud service. Multiple cloud services may be listed and identified. A user's authentication credentials for accessing the cloud service may be required or may be automatically stored in connection with his or her profile or the mobile application that enables interaction with the MFP. If a new cloud service is selected, the mobile device may enable a user to input relevant credentials at that time.

Figure 7:
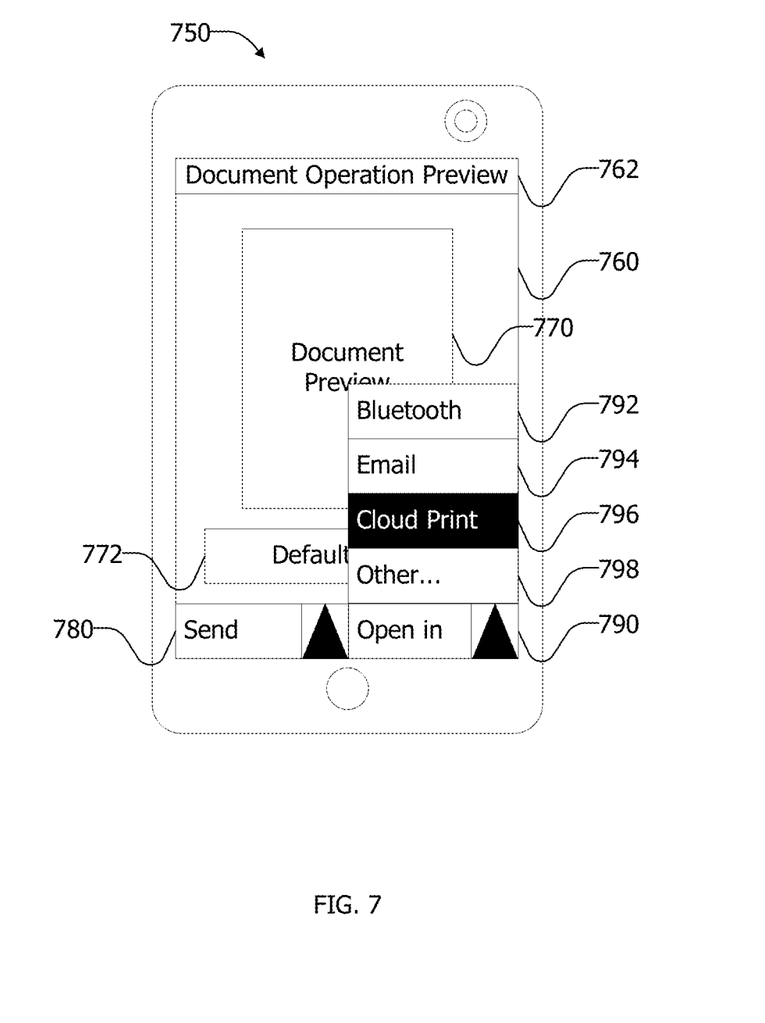
FIG. 7 is a mobile device user interface showing another set of alternative actions.

Turning now to FIG. 7, a mobile device user interface showing another set of alternative actions is shown. The mobile device 750, user interface 760, document preview 770, default action button 772, alternative action menus 780 and 790 are substantially the same as those shown in FIG. 5. They will not be discussed again here.

However, as seen in FIG. 7, alternative action menu 790 has been selected and alternative actions are available. This alternative action menu 790 includes operations of "open in" type that enable the resulting document to be "opened" one or more applications on the mobile device 750.

Selection of the Bluetooth® button 792 causes the mobile device 750 to open a Bluetooth® transmission application that enables the mobile device to transmit the resulting document to another Bluetooth®-enabled device (e.g. another mobile device, a Bluetooth® printer, a Bluetooth®-enabled notebook computer, etc.).

Selection of the email button 794 causes the mobile device 750 to open the resulting document in an email application on the mobile device for email directly from the mobile device (as opposed to transmission by the MFP).

Selection of the cloud print button 796 causes the mobile device to access a cloud print services to enable printing directly from the mobile device at a location available to the cloud print services. For example, Google Print service enables a user of a mobile device to print, via the Internet, at any printer enabled via the Google Print service. Similarly, services that enable printers to print directly via the Internet maybe accessible to the mobile device 750 directly via an application on the mobile device. The cloud print button is selected, as shown by the inverted dark background and light text.

Selection of the "other . . . " button 798 may enable direct selection of other mobile applications on the mobile device 750 to open the document that is generated as a result of the document processing operation.

Figure 8:
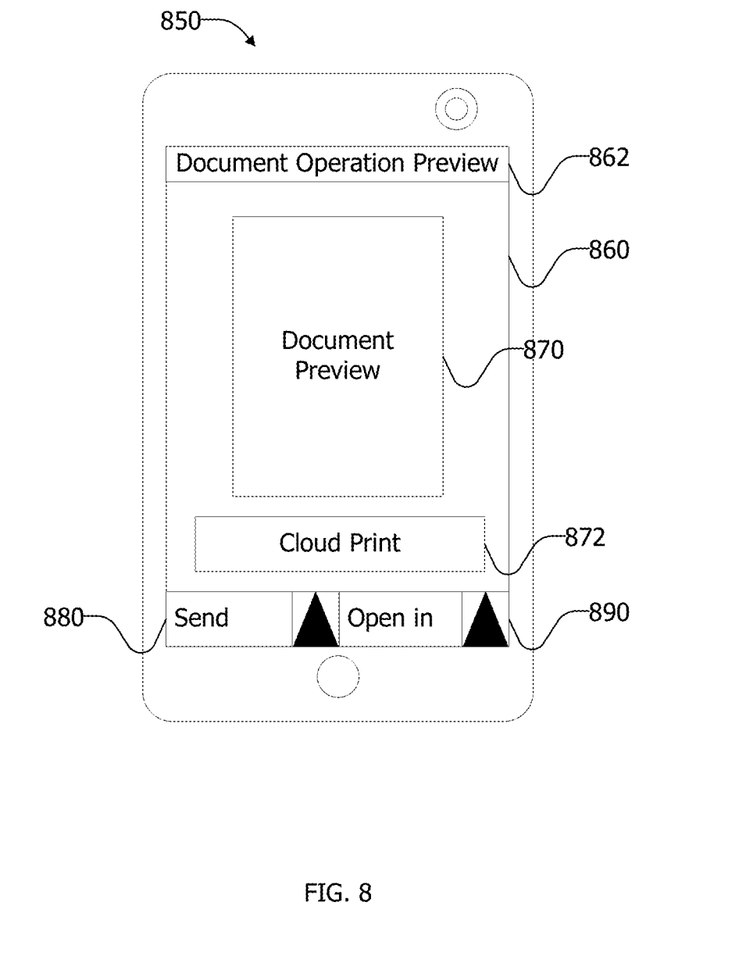
FIG. 8 is a mobile device user interface showing a new default action.

Turning now to FIG. 8, a mobile device user interface showing a new default action is shown. The mobile device 850, user interface 860, document preview 870, default action button 872, alternative action menus 880 and 890 are substantially the same as those shown in FIG. 5. They will not be discussed again here.

However, as shown in FIG. 7, the cloud print has been selected in place of the default action. As a result, in FIG. 8, the cloud print button 872 now appears as the new default action. Similarly, when the user next performs the same document processing operation, the cloud print button 872 will again be shown as the default action.

The cloud print button 872 may be the default action for only the particular document processing operation identified by the document operation preview 862. For example, the document operation may be a print operation and may have an associated default action. The scan operation may have its own associated default action. As a result, the user initiation of a document processing operation via the mobile device 850 may present the user with the last-selected or most commonly-selected default action regarding that document processing operation. For a different document processing operation, a different default action may appear.

Description of Processes

Figure 9:
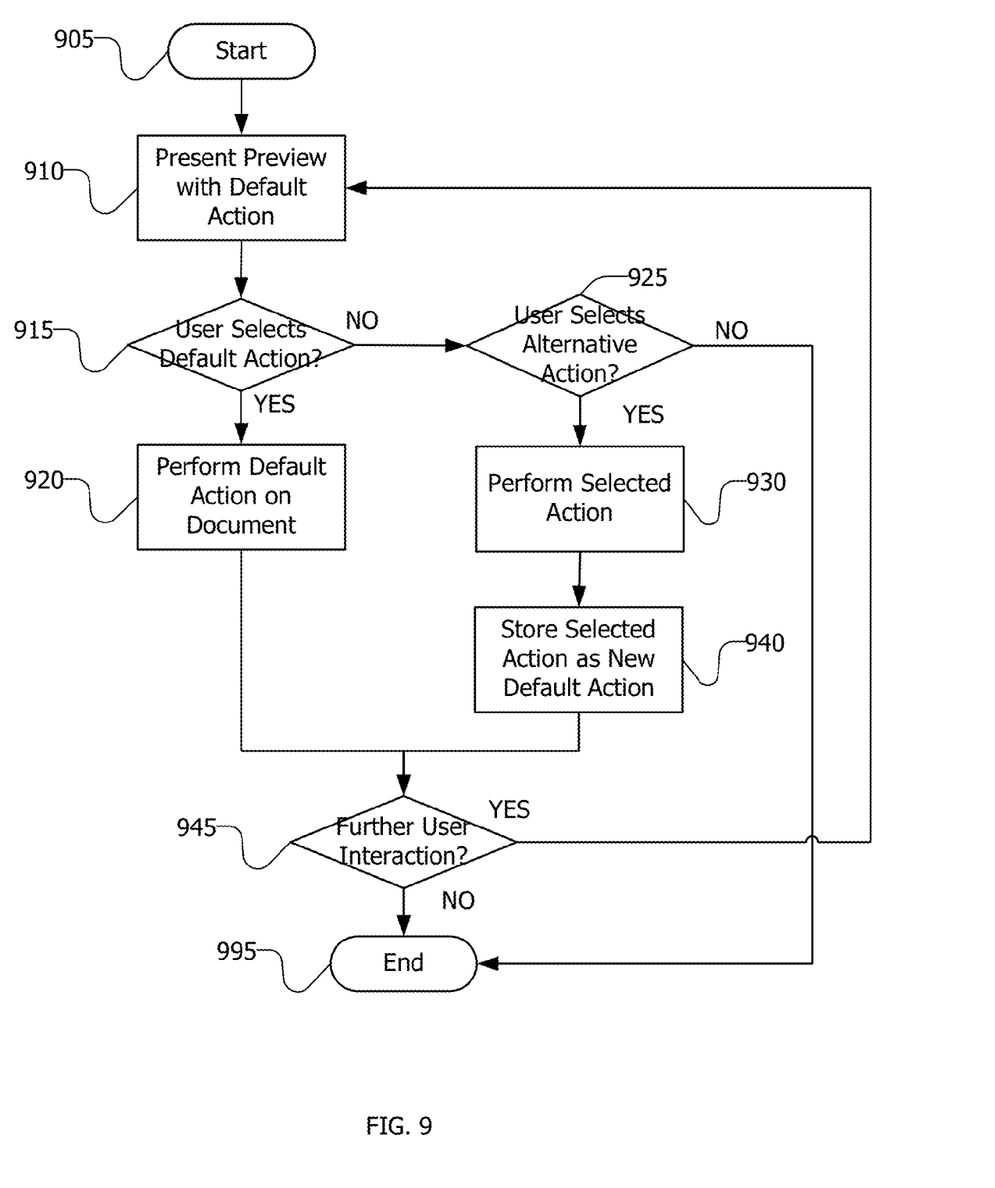
FIG. 9 is a flowchart for the operation of mobile device software.

Turning now to FIG. 9, a flowchart for the operation of mobile device software is shown. The flowchart begins at start 905 and ends at end 995. The process may begin once a user has initiated a document processing operation using the mobile device. As shown in the flowchart, the process may repeat an indeterminate number of times.

First, a user is presented with a default action at 910 as a part of the initiation process for a new document processing operation via a mobile device. For example, the user may elect to utilize his or her mobile device to initialize a scan operation. Once this operation is selected and an appropriate MFP selected to perform the operation, the MFP may scan the associated document and generate a document preview 570 (as shown in FIG. 5). The remainder of the user interface 560 may also be shown at this point along with a default action presented at 910.

Next, a determination is made whether or not the user has selected the default action at 915. If the user selects the default action at 915, then the default action is performed on the resulting document. This may be, for example, storage of the resulting document to a network drive.

If the user selects a non-default action at 915 (as shown in FIG. 6 and FIG. 7), then this means that the user has activated the list of alternative actions. This results in a display of the list of alternative actions from which the user may select (or may still select the default action which is also still displayed).

Once the user selects an alternative action at 925, the selected action is performed at 930. Substantially simultaneously, the selected action is stored as the new default action at 940 and the prior default action merely becomes one of the list of alternative actions. In this sense, the new default action is excluded from the list of alternative actions while the default action is included in the list of alternative actions from this point until a further change is made. This may be seen in FIGS. 7 and 8, wherein "cloud print" is selected and performed, then automatically presented as the new default action. This storage may be in the cloud or on the mobile device itself. Going forward, at least for this particular document processing operation (print, scan, email, fax, etc.) that newly-selected default action will be presented as the default action and the prior default action will be a part of the list of alternative actions.

Regardless of whether a the default action was performed at 920 or the new action was performed and stored at 930 and 940, a determination is made whether the user has further interaction with the mobile device at 945 involving document processing operations. If not, the process ends. If further interaction with the mobile device regarding document processing operations are to take place, then the process resumes at 910.

As indicated above, the default action may be stored on the mobile device or stored in the cloud. Therefore, the default action may remain regardless of the MFP selected to perform a document processing operation. So, long as the user begins a document processing operation using the mobile device (or the user account associated with the cloud-stored default action), the default action will remain the same, no matter what MFP the user has selected.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for automatic selection of mobile device default action comprising:
    presenting, on a mobile device, a default action and a list of alternative actions that identify document processing operations that may be completed by a multifunction peripheral to thereby generate an electronic document, the default action automatically selected and the list of alternative actions available for selection;
    receiving a single user interaction, on the mobile device, selecting an alternative action from the list of alternative actions;
    in response to receipt of the single user interaction:
        storing the selected alternative action as a new default action;
        sending instructions to the multifunction peripheral to begin a document processing operation identified by the selected alternative action; and
    presenting, on the mobile device, the new default action and a second list of alternative actions available for selection upon receipt of further user interaction, the second list of alternative actions including the default action and excluding the new default action.

2. The method of claim 1 wherein the instructions include a location where to store the electronic document.

3. The method of claim 2 wherein the location is a cloud service and further wherein the mobile device automatically authenticates with the cloud service to enable storage of the electronic document.

4. The method of claim 2 wherein the location is a network storage location and further wherein the mobile device automatically authenticates with the network storage location to enable storage of the electronic document.

5. The method of claim 1 wherein the instructions include a secondary operation to be performed with the resulting electronic document upon completion of the document processing operation.

6. The method of claim 5 wherein the secondary operation is transmission of the electronic document to a selected one of (1) a Bluetooth-enabled device and (2) print output via a cloud printing service at a location remote from both the mobile device and the multifunction peripheral device.

7. The method of claim 1 wherein the new default action is stored in association with one of (1) the mobile device and (2) in the cloud, such that the new default action remains a default independent of any multifunction peripheral used.

8. An apparatus, including a processor and associated memory, the apparatus including software that when executed by the processor causes the processor to:
    present a default action and a list of alternative actions that identify document processing operations that may be completed by a multifunction peripheral to thereby generate an electronic document, the default action automatically selected and the list of alternative actions available for selection;
    receive a single user interaction selecting an alternative action from the list of alternative actions;
    in response to receipt of the single user interaction, store the selected alternative action as a new default action;
    in response to receipt of the single user interaction, send instructions to the multifunction peripheral to begin a document processing operation identified by the selected alternative action; and
    in response to receipt of the single user interaction, and upon further user interaction present the new default action and a second list of alternative actions available for selection, the second list of alternative actions including the default action and excluding the new default action.

9. The apparatus of claim 8 wherein the instructions include a location where to store the electronic document.

10. The apparatus of claim 9 wherein the location is a cloud service and further wherein the mobile device automatically authenticates with the cloud service to enable storage of the electronic document.

11. The apparatus of claim 9 wherein the location is a network storage location and further wherein the mobile device automatically authenticates with the network storage location to enable storage of the electronic document.

12. The apparatus of claim 8 wherein the instructions include a secondary operation to be performed with the resulting electronic document upon completion of the document processing operation.

13. The apparatus of claim 12 wherein the secondary operation is transmission of the electronic document to a selected one of (1) a Bluetooth-enabled device and (2) print output via a cloud printing service at a location remote from both the mobile device and the multifunction peripheral device.

14. The apparatus of claim 8 wherein the new default action is stored in association with one of (1) the mobile device and (2) in the cloud, such that the new default action remains a default independent of any multifunction peripheral used.

15. An apparatus comprising a mobile device in communication with a multifunction peripheral, the mobile device comprising:
    a display for presenting a default action and a list of alternative actions that identify document processing operations that may be completed by a multifunction peripheral to thereby generate an electronic document, the default action automatically selected and the list of alternative actions available for selection;

a user interface for receiving a single user interaction to select an alternative action from the list of alternative actions;

a storage for storing the selected alternative action as a new default action in response to receipt of the single user interaction;

a communication interface for sending instructions to the multifunction peripheral to begin a document processing operation identified by the selected alternative action in response to receipt of the single user interaction; and the display further for presenting the new default action and a second list of alternative actions available for selection in response to receipt of the single user interaction upon receipt of further user interaction, the second list of alternative actions including the default action and excluding the new default action.

16. The apparatus of claim 15 wherein the instructions include a location where to store the electronic document.

17. The apparatus of claim 16 wherein the location is a cloud service and further wherein the mobile device automatically authenticates with the cloud service to enable storage of the electronic document.

18. The apparatus of claim 16 wherein the location is a network storage location and further wherein the mobile device automatically authenticates with the network storage location to enable storage of the electronic document.

19. The apparatus of claim 15 wherein the instructions include a secondary operation to be performed with the resulting electronic document upon completion of the document processing operation.

20. The apparatus of claim 19 wherein the secondary operation is transmission of the electronic document to a selected one of (1) a Bluetooth-enabled device and (2) print output via a cloud printing service at a location remote from both the mobile device and the multifunction peripheral device.

* * * * *